Oct. 31, 1939.  R. A. SPITZ ET AL  2,177,912
FISHING DEVICE
Filed May 19, 1939
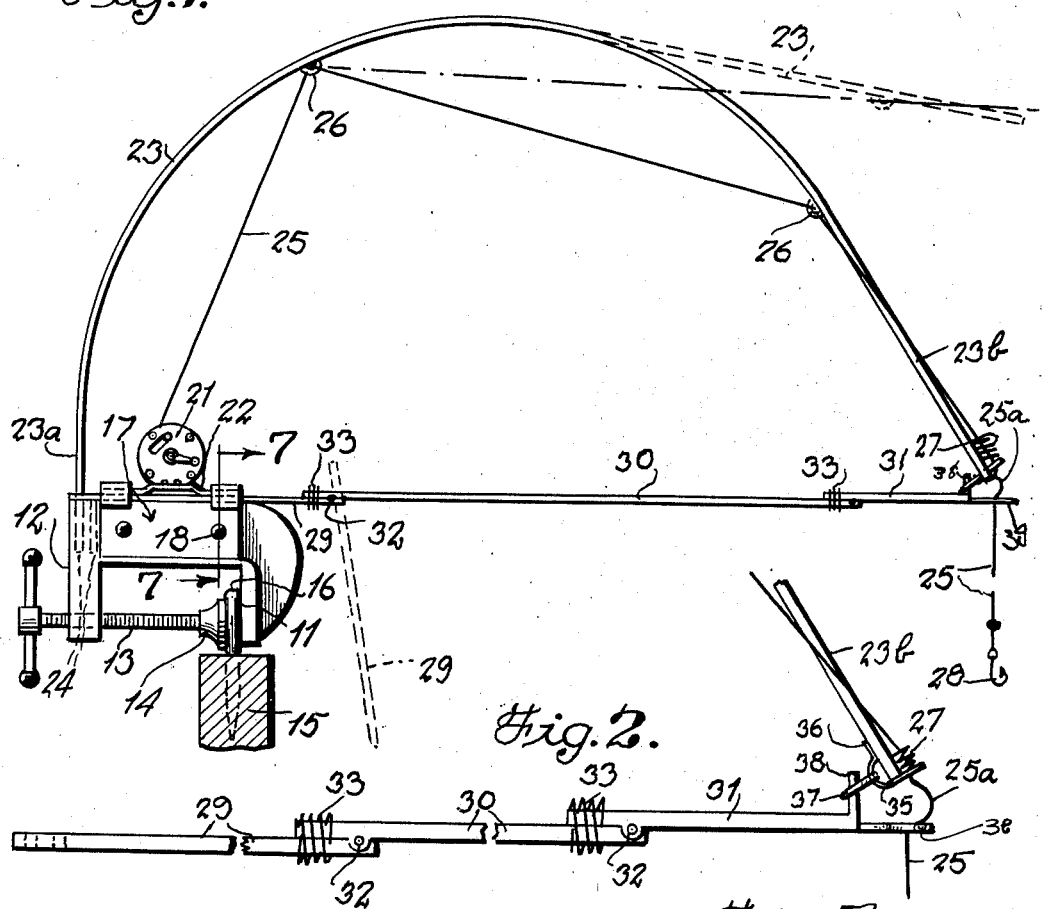
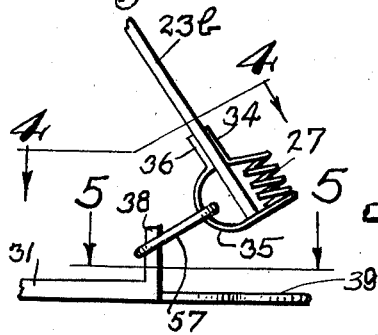
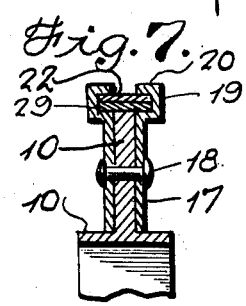
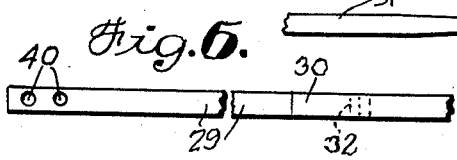
Inventors
Rudolph A. Spitz,
Laurence Visovatti &
Owen Cobble Patented Oct. 31, 1939

2,177,912

UNITED STATES PATENT OFFICE 2,177,912

FISHING DEVICE

Rudolph A. Spitz, Lawrence Visovatti, and Owen Cobble, Milwaukee, Wis.

Application May 19, 1939, Serial No. 274,626

7 Claims. (Cl. 43—4)

This invention relates to certain new and useful improvements in fishing devices.

The primary object of the invention is to provide a fishing device in which a reel, line and resilient rod are associated with a support or holder in combination with a trip device for holding the resilient rod in a bowed position when the line is baited and set for fishing with the trip device releasable from the outer end of the resilient bowed rod to cause sudden snap movement of the bowed rod into a straight position and a consequent pull on the fishing line for hooking a fish.

A further object of the invention is to provide a fishing device of the foregoing character wherein the holder for the fishing rod, reel and line may be mounted upon the gunwale of a boat so that the fisherman is free for other duties when the fishing device is set, it being also possible to use the device for dock or pier fishing or from the bank of a lake or river or ice fishing.

With the above and other objects in view that will become apparent as the nature of the invention is better understood, the same consists in the novel form, combination and arrangement of parts hereinafter more fully described, shown in the accompanying drawing and claimed.

In the drawing:

Figure 1 is a side elevational view of a fishing device constructed in accordance with the present invention, the same being illustrated as mounted upon the gunwale of a boat that is shown in section, the resilient rod of the fishing device and the trip therefor being fragmentarily illustrated by dotted lines in their released fish catching position;

Figure 2 is a fragmentary side elevational view of the sectional trip rod and the outer end of the resilient fishing rod engaged therewith, springs being associated with the hinge connection between the sections of the trip rod for holding them in alinement during the setting of the fishing device;

Figure 3 is a fragmentary side elevational view of the outer end of the trip device engaged with the outer end of the resilient fishing rod;

Figure 4 is a detail sectional view taken on line 4—4 of Figure 3, showing the link connection between the outer end of the resilient fishing rod and the trip device;

Figure 5 is a detail sectional view taken on line 5—5 of Figure 3, showing the spring finger holder for the fishing line carried by the trip device;

Figure 6 is a fragmentary top plan view of the trip device; and

Figure 7 is a detail sectional view taken on line 7—7 of Figure 1.

Referring more in detail to the accompanying drawing, there is illustrated a fishing reel, a line, a resilient rod and a trip device for holding the rod in bowed position when the fishing line is set, all of said elements being mounted upon a support in the form of a clamp designated by the reference character 10 that comprises a pair of clamp arms 11 and 12, a clamping screw 13 being threaded through the arm 12 and having a head 14 thereon for cooperation with the arm 11 to anchor the clamp to a support. As shown in Figure 1, the support or clamp is attached to the gunwale 15 of a boat through the medium of a wing screw 16, the shank of the screw being threaded perpendicularly in the gunwale 15 with the head thereof engaged by the clamp arm 11 and cooperating screw head 14.

A plate 17 is anchored to each side of the clamp 10 by means of rivets 18, the plate 17 being preferably of rectangular formation and each upper corner edge thereof carrying a channel-shaped lug 19 extending above the upper edge of the clamp body 10 and having a flange 20 overlying and spaced above the upper edge of the clamp 10 as clearly shown in Figure 7. The fishing reel 21 includes a bracket plate having outwardly directed arms 22 that are slid into position upon the upper end of the clamp 10 to be confined by the flanges 20 of the channel lugs 19. The fishing rod 23 is normally straight and resilient, the inner end 23a of the resilient fishing rod 23 being removably set into one of the perpendicular openings 24 at the upper end of the clamp arm 12 as illustrated by dotted lines in Figure 1. The fishing line 25 extending from the reel 21 is threaded through suitably spaced guide eyes 26 carried by the rod 23 and further through a coiled wire guide 27 to be later described more in detail at the outer end 23b of the fishing rod 23, the fishing line 25 having a fish hook 28 at its free end.

A trip device is associated with the clamp 10 and resilient rod 23 for holding the latter in a bowed position as illustrated in Figure 1 when the fishing device is set, the trip device preferably comprising a rod formed of three sections 29, 30 and 31 that are hingedly connected together as at 32, the hinged end of the rod section 31 overlying the outer end of the intermediate rod section 30 while the hinged inner end of the rod section 30 overlies the outer end of the inner rod section 29, the overlapping ends of the rod sections being in abutting engagement with the underlying ends of the associated rod sections so that the two outer rod sections 30 and 31 may only move upwardly into alignment with the inner rod section 29, but may swing downwardly on their hinge connections 32. Coil springs 33 are slidable on the sectional rod for holding the rod sections in alignment during the setting of the trip, but are displaced from the overlying ends of the rod sections when the fishing device is set to permit downward swinging movement of the rod sections 30 and 31.

The fishing line guide 27 is located at the outer side of the outer end 23b of the resilient fishing rod 23 and the wire of said coiled guide, as shown more clearly in Figure 3, carries an end extension 34 from one end of the coil that is secured to the outer side of the fishing rod while an extension from the other end of the wire guide coil 27 extends across the outer end of the fishing rod and is bent to provide a loop 35 with the terminal end of the loop flatly engaged with the inner side of the fishing rod as at 36. A link 37 is carried by the loop 35 and is engageable with an upstanding finger 38 rising from the outer end of the trip rod section 31. A pair of resilient wire fingers 39 extends from the outer end of the rod section 31 in line therewith and between which fingers, the fishing line 25 is positioned to be frictionally retained thereby, the fishing line 25 above said fingers preferably is flexed as at 25a as shown in Figure 1.

The inner rod section 29, as shown in Figures 1 and 7, is slidably mounted in the clamp 10 beneath the arms 22 of the reel 21, the inner end of the rod section 29 having a pair of openings 40 therein that register with the openings 24 in the clamp arm 12 with the inner end 23a of the resilient fishing rod 23 passing through a selected one of said openings 40 for retaining the sectional trip rod in position on the clamp.

The fishing device is illustrated in its set position by full lines in Figure 1 and when a fish bites upon the hook 28, there is a slight downward pull on the outer end of the trip rod section 31 to disengage the trip finger 38 from the link 37, the inherent resiliency of the rod 23 tending to straighten out the rod and exert a sudden jerk or pull on the fishing line for snagging or catching the fish. It is understood that the position retaining springs 33 associated with the trip rod sections were previously disengaged from the overlapping ends of said trip rod section so that when the link 37 is disengaged from the finger 38, the trip rod sections drop down to an out-of-the-way position as shown by dotted lines in Figure 1. The fisherman may then play the reel 21 for the proper landing of the caught fish. It will also be understood that the fishing line 25 is disengaged from the spring fingers 39 by an outward and upward pull of the spring rod 23 so that the fish may be played without hindrance with the aid of the line and reel.

While there is herein shown and described the preferred embodiment of the invention, it is nevertheless to be understood that minor changes may be made therein without departing from the spirit and scope of the invention as claimed.

What is claimed is:

1. In a fishing device of the character described, a supporting member, a resilient fishing rod attached at one end to said member, and a trip device carried by said member and releasably engageable with the outer end of the fishing rod for holding the rod in bowed position against the resiliency thereof when the rod is set for fishing, a fishing line reel supported on said member, line guides carried by said rod and means carried by the trip device resiliently engaged with said line outwardly of the connection between the line and trip device.

2. In a fishing device of the character described, a supporting member, a resilient fishing rod attached at one end to said member, and a trip device carried by said member and releasably engageable with the outer end of the fishing rod for holding the rod in bowed position against the resiliency thereof when the rod is set for fishing, the supporting member comprising a clamp adapted for attachment to a holder, and the trip device comprising a rod formed of hingedly connected sections movable only in downward direction when released from said fishing rod.

3. In a fishing device of the character described, a supporting member, a resilient fishing rod attached at one end to said member, and a trip device carried by said member and releasably engageable with the outer end of the fishing rod for holding the rod in bowed position against the resiliency thereof when the rod is set for fishing, a fishing line reel supported on said member, line guides carried by said rod and means carried by the trip device resiliently engaged with said line outwardly of the connection between the line and trip device, the supporting member comprising a clamp adapted for attachment to a holder and the trip device comprising a rod formed of hingedly connected sections movable only in downward direction when released from said fishing rod.

4. In a fishing device of the character described, a supporting member, a resilient fishing rod attached at one end to said member, and a trip device carried by said member and releasably engageable with the outer end of the fishing rod for holding the rod in bowed position against the resiliency thereof when the rod is set for fishing, the supporting member comprising a clamp adapted for attachment to a holder, and the trip device comprising a rod formed of hingedly connected sections movable only in downward direction when released from said fishing rod, the connection between the trip device and fishing rod including a finger rising from the outer end of the sectional rod and a link on the outer end of the fishing rod held in frictional engagement with said finger by the inherent resiliency of said fishing rod.

5. In a fishing device of the character described, a supporting member, a resilient fishing rod attached at one end to said member, and a trip device carried by said member and releasably engageable with the outer end of the fishing rod for holding the rod in bowed position against the resiliency thereof when the rod is set for fishing, a fishing line reel supported on said member, line guides carried by said rod and means carried by the trip device resiliently engaged with said line outwardly of the connection between the line and trip device, the supporting member comprising a clamp adapted for attachment to a holder and the trip device comprising a rod formed of hingedly connected sections movable only in downward direction when released from said fishing rod, the connection between the trip device and fishing rod including a finger rising from the outer end of the sectional rod and a link on the outer end of the fishing rod held in frictional engagement with said finger by the inherent resiliency of said fishing rod.

6. In a fishing device of the character described, a supporting member, a resilient fishing rod attached at one end to said member, and a trip device carried by said member and releasably engageable with the outer end of the fishing rod for holding the rod in bowed position against the resiliency thereof when the rod is set for fishing, the trip device comprising a rod formed of hingedly connected sections, the outer sections each having a part extending inwardly of the hinge and overlying the other end of the adjacent inner section whereby said sections swing downwardly when the trip device is released from said resilient fishing rod.

7. In a fishing device of the character described, a supporting member, a resilient fishing rod attached at one end to said member, and a trip device carried by said member and releasably engageable with the outer end of the fishing rod for holding the rod in bowed position against the resiliency thereof when the rod is set for fishing, a fishing line reel supported on said member, line guides carried by said rod and means carried by the trip device resiliently engaged with said line outwardly of the connection between the line and trip device, the trip device comprising a rod formed of hingedly connected sections, the outer sections each having a part extending inwardly of the hinge and overlying the outer end of the adjacent inner section whereby said sections swing downwardly when the trip device is released from said resilient fishing rod.

RUDOLPH A. SPITZ.
LAWRENCE VISOVATTI.
OWEN COBBLE.